US009873614B2

(12) United States Patent
Lai

(10) Patent No.: US 9,873,614 B2
(45) Date of Patent: Jan. 23, 2018

(54) SYNTHESIS OF ZSM-48 CRYSTALS

(71) Applicant: Wenyih Frank Lai, Bridgewater, NJ (US)

(72) Inventor: Wenyih Frank Lai, Bridgewater, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 505 days.

(21) Appl. No.: 14/549,740

(22) Filed: Nov. 21, 2014

(65) Prior Publication Data
US 2015/0183647 A1   Jul. 2, 2015

Related U.S. Application Data

(60) Provisional application No. 61/920,796, filed on Dec. 26, 2013.

(51) Int. Cl.
*C01B 39/48* (2006.01)
*B01J 29/70* (2006.01)

(52) U.S. Cl.
CPC ............ *C01B 39/48* (2013.01); *B01J 29/703* (2013.01); *C01P 2004/10* (2013.01)

(58) Field of Classification Search
CPC ............................... C01B 39/48; B01J 29/703
See application file for complete search history.

(56) References Cited

U.S. PATENT DOCUMENTS

| 3,354,078 | A | 11/1967 | Miale |
| 6,923,949 | B1 | 8/2005 | Lai et al. |
| 7,482,300 | B2 * | 1/2009 | Lai .................. B01J 29/703 |
| | | | 502/60 |

(Continued)

FOREIGN PATENT DOCUMENTS

| WO | 0142317 A2 | 5/1985 |
| WO | 2007070521 A1 | 6/2007 |

(Continued)

OTHER PUBLICATIONS

Lee et al., "Reinvestigation into the synthesis of zeolites using diquaternary alkylammonium ions (CH3)3N+(CH3)3 with n=3-10 as structure-directing agents", Microporous and Mesoporous Materials, Mar. 8, 2004, pp. 97-104, vol. 68, No. 1-3, Elsevier Science Publishing, New York, US.

(Continued)

Primary Examiner — David M Brunsman
(74) Attorney, Agent, or Firm — Lisa K. Holthus

(57) ABSTRACT

Methods are provided for synthesis of substantially pure phase ZSM-48 crystals having a fiber or needle morphology based on synthesis mixtures containing non-sodium alkali metal ions, where the structure directing agent in the synthesis mixture can be a diquaternary alkylammonium salt with a 6-carbon atom chain between the ammonium ions (diquat-6). The methods described herein can be used to make ZSM-48 crystals having a fiber and/or needle crystal morphology from a synthesis mixture containing a diquat-6 structure directing agent. The desired morphology can be achieved in part by reducing, minimizing, and/or eliminating the presence of sodium ions in the synthesis mixture.

15 Claims, 9 Drawing Sheets

(56) References Cited

U.S. PATENT DOCUMENTS

| | | | |
|---|---|---|---|
| 8,003,074 B2* | 8/2011 | Lai | B01J 29/703 |
| | | | 423/704 |
| 2007/0131581 A1 | 6/2007 | Lai et al. | |
| 2009/0076317 A1 | 3/2009 | Lai et al. | |

FOREIGN PATENT DOCUMENTS

| | | |
|---|---|---|
| WO | 2009038740 A2 | 3/2009 |
| WO | 2011056740 A2 | 5/2011 |

OTHER PUBLICATIONS

International Search Report and Written Opinion from PCT/US2014/066752 dated Apr. 14, 2015.

* cited by examiner

SYNTHESIS OF ZSM-48 CRYSTALS

CROSS-REFERENCE TO RELATED APPLICATIONS

This application claims the benefit of U.S. Application Ser. No. 61/920,796 filed on Dec. 26, 2013; which is incorporated by reference herein in its entirety.

FIELD OF THE INVENTION

Zeolites with improved morphology are described along with methods for preparing the same.

BACKGROUND OF THE INVENTION

Zeolite crystal structures have found a wide range of applications within refinery processes and other processes for manipulating petroleum streams. Some zeolite applications are catalytic in nature, while other applications focus on the ability of zeolites to selectively adsorb molecules within a gas stream.

One type of zeolite structure used for catalytic processing of petroleum streams is ZSM-48, which is a zeolite of the MRE framework type. As for many zeolites, the composition of the synthesis mixture used to form ZSM-48 (or other MRE framework type zeolites) can have a strong impact on the crystalline structure and/or morphology of the resulting zeolites.

U.S. Pat. No. 6,923,949 describes methods for forming ZSM-48 crystals using synthesis mixtures that include non-ZSM-48 seed crystals. The resulting ZSM-48 crystals can have an X-ray diffraction pattern corresponding to ZSM-48, although the presence of the non-ZSM-48 seed crystals can be detected based on activity tests. For crystals having a silica to alumina ratio of about 70 to 1 to 150 to 1, the ZSM-48 crystals formed using non-ZSM-48 seeds are described as being small, irregularly shaped crystals that are free from fibrous morphology. For crystals with a silica to alumina ratio of less than 70 to 1, the ZSM-48 crystals are described as being mixtures of small, irregularly shaped crystals and needle morphology crystals.

U.S. Pat. No. 7,482,300 describes methods for forming ZSM-48 crystals without the use of non-ZSM-48 seeds in the synthesis mixture for forming the crystals. The structure directing agent used for forming the ZSM-48 crystals is described as a hexamethonium salt, such as hexamethonium chloride. The resulting crystals can have a silica to alumina ratio from about 70 to 1 to about 110 to 1, and are described as being substantially free of fibrous morphology. Preferred ranges are also described for the molar ratio of $OH^-$ to $SiO_2$ and the molar ratio of structure directing agent (or template) to $SiO_2$. The preferred ranges are described as suitable for formation of crystals that are substantially free of needle-like morphology crystals.

U.S. Pat. No. 8,003,074 describes methods for forming ZSM-48 crystals using a diquaternary ammonium salt structure directing agent with a 5 carbon atom alkyl chain between the ammonium ions (a "diquat-5" structure directing agent). Synthesis of ZSM-48 crystals using mixtures of a "diquat-5" structure directing agent and other structure directing agents, such as a "diquat-6" structure directing agent, is also described. Various types of synthesis mixtures are described that result in formation of fibrous and/or needle-like crystal morphologies.

SUMMARY OF THE INVENTION

In one aspect, a method of synthesizing ZSM-48 crystals is provided. At least 25 vol % of the as-synthesized ZSM-48 crystals can have a fiber morphology, a needle-like morphology, or a combination thereof. The method can include crystallizing a reaction mixture comprising a source of water, a source of $SiO_2$, a source of $Al_2O_3$, a source of an alkali metal, M, the alkali metal being Li, K, or a combination thereof, and a source of a structure directing agent in the form of an organic cation, Q, having the structure $R_1$—$R_3$—$R_2$, the reaction mixture having a molar ratio of structure directing agent cation, Q, to $SiO_2$ in said reaction mixture of about 0.01 to about 0.05; a molar ratio of $SiO_2$ to $Al_2O_3$ in said reaction mixture of about 50 to about 120; a molar ratio of water to $SiO_2$ in said reaction mixture of about 1 to about 500; a molar ratio of hydroxyl group concentration to $SiO_2$ in said reaction mixture is from about 0.1 to about 0.3; and a molar ratio of alkali metal, M, to $SiO_2$ in said reaction mixture is from about 0.05 to about 0.4, where $R_1$ and $R_2$ are the same or different, $R_1$ and $R_2$ being tetraalkylammonium groups having the formula —$N^+$—RR'R", where R, R', and R" are each the same or different, the R, R', and R" alkyl groups each being an alkyl group having from 1 to 10 carbons, and where $R_3$ is a polymethylene group of formula $(CH_2)_n$, where n=6.

The invention can additionally or alternatively relate to a porous crystalline composition that can include a crystalline material having a ZSM-48 framework structure, the crystalline material having a ratio of $SiO_2$:$Al_2O_3$ of about 70 to about 110, at least 25% of the crystalline material having a fibrous morphology, and a structure directing agent within the pore structure of the crystalline material, the structure directing agent comprising a salt of an organic cation having the structure $R_1$—$R_3$—$R_2$, a molar ratio of structure directing agent to $SiO_2$ being about 0.015 to about 0.025, where $R_1$ and $R_2$ are the same or different, $R_1$ and $R_2$ being tetraalkylammonium groups having the formula —$N^+$—RR'R", where R, R', and R" are each the same or different, the R, R', and R" alkyl groups each being an alkyl group having from 1 to 10 carbons, and where $R_3$ is a polymethylene group of formula $(CH_2)_n$, where n=6.

Further additionally or alternatively, the invention can relate to a porous crystalline composition that can include a crystalline material having a ZSM-48 framework structure, the crystalline material having a ratio of $SiO_2$:$Al_2O_3$ of about 70 to about 110, at least 25% of the crystalline material having a fibrous morphology, a needle morphology, or a combination thereof, the material made by process comprising crystallizing a reaction mixture comprising a source of water, a source of $SiO_2$, a source of $Al_2O_3$, a source of an alkali metal, M, the alkali metal being Li, K, or a combination thereof, and a source of a structure directing agent in the form of an organic cation, Q, having the structure $R_1$—$R_3$—$R_2$, the reaction mixture having a molar ratio of structure directing agent cation, Q, to $SiO_2$ in said reaction mixture of about 0.01 to about 0.05; a molar ratio of $SiO_2$ to $Al_2O_3$ in said reaction mixture of about 50 to about 120; a molar ratio of water to $SiO_2$ in said reaction mixture of about 1 to about 500; a molar ratio of hydroxyl group concentration to $SiO_2$ in said reaction mixture is from about 0.1 to about 0.3; and a molar ratio of alkali metal, M, to $SiO_2$ in said reaction mixture is from about 0.05 to about 0.4, where $R_1$ and $R_2$ are the same or different, $R_1$ and $R_2$ being tetraalkylammonium groups having the formula —$N^+$—RR'R", where R, R', and R" are each the same or different, the R, R', and R" alkyl groups each being an alkyl group having from 1 to 10 carbons, and where $R_3$ is a polymethylene group of formula $(CH_2)_n$, where n=6.

DETAILED DESCRIPTION OF THE EMBODIMENTS

Overview

Figure 1A:
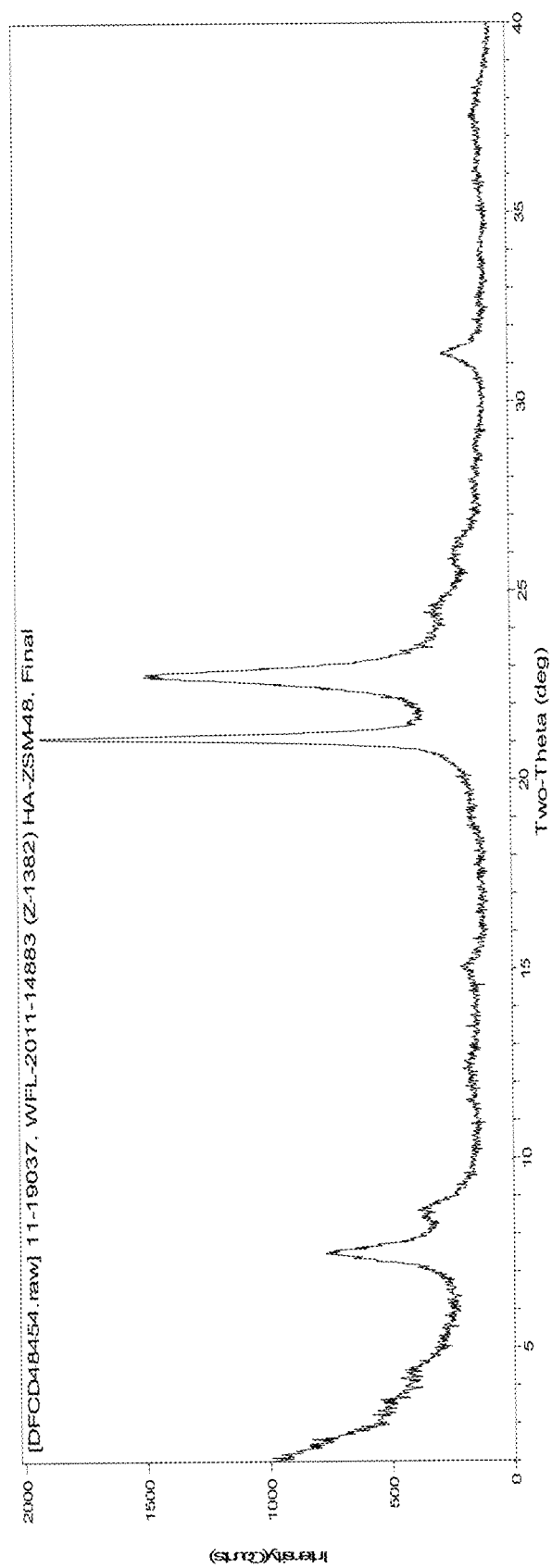
FIG. 1A shows an XRD plot of ZSM-48 crystals made according to a prior art method.

In various aspects, methods are provided for synthesis of substantially pure phase ZSM-48 crystals having a fiber or needle morphology based on synthesis mixtures containing non-sodium alkali metal ions, where the structure directing agent in the synthesis mixture can be a diquaternary alkylammonium salt with a 6-carbon atom chain between the ammonium ions (diquat-6). The methods described herein can be used to make ZSM-48 crystals having a fiber and/or needle crystal morphology from a synthesis mixture containing a diquat-6 structure directing agent. The desired morphology can be achieved in part by reducing, minimizing, and/or eliminating the presence of sodium ions in the synthesis mixture. For example, synthesis mixtures for forming zeolites such as ZSM-48 can often include a base, such as sodium hydroxide. Additionally, various sodium salts can often be used in a synthesis mixture for forming ZSM-48, such as using sodium aluminate as an aluminum source for the zeolite. Instead of using sodium, alternative bases and/or reagents can be used to reduce, minimize, and/or eliminate the amount of sodium in the synthesis mixture. Suitable bases for use in place of sodium sources (such as sodium hydroxide) can include, for example, non-sodium alkali metal sources (e.g., also hydroxides such as potassium hydroxide and/or lithium hydroxide). In other aspects, compositions of matter corresponding to such ZSM-48 crystals are also described herein. In still other aspects, the methods described herein can generally be applied to synthesis of zeolites having the MRE framework structure, as described in the zeolite database maintained by the International Zeolite Association.

In this discussion, various examples may describe the use of $SiO_2$, $Al_2O_3$, and an alkali metal for synthesis of zeolites. In the discussion herein, it should be understood that other crystals having a zeolite framework structure can generally be synthesized using other tetravalent elements (X) in place of or in combination with silicon, such as tin, germanium, or a combination thereof; other trivalent elements (Y) in place of or in combination with aluminum, such as boron, indium, gallium, iron, or a combination thereof; and other alkali and/or alkaline earth elements (M) in place of or in combination with sodium, such as potassium, magnesium, calcium, or a combination thereof. Thus, when a ratio of $SiO_2:Al_2O_3$ is described, it should be understood that similar ratios of $XO_2:Y_2O_3$ may often be equally suitable for formation of a material having the corresponding zeolite framework structure.

Traditionally, a variety of structure directing agents have been used for synthesis of zeolites with an MRE framework type, such as ZSM-48. Some structure directing agents have traditionally been used for synthesis of ZSM-48 crystals with a fiber and/or needle-like morphology, while other structure directing agents have traditionally been used for synthesis of ZSM-48 crystals having other types of morphologies. In particular, "diquat-6" type structure directing agents, corresponding to a diquaternary ammonium salt with a 6-carbon atom chain connecting the ammonium ions, have traditionally been viewed as unsuitable for forming ZSM-48 crystals having an $SiO_2:Al_2O_3$ ratio of less than 110 and with a needle-like or fiber morphology. As a result, other types of structure directing agents have traditionally been used when forming such crystals. However, it has been unexpectedly discovered that by reducing, minimizing, or eliminating the amount of sodium present in the synthesis mixture, ZSM-48 crystals with a combination of a $SiO_2:Al_2O_3$ ratio of less than 110 and a substantial amount of fiber and/or needle morphology can be synthesized.

In various embodiments, the ZSM-48 crystals recovered from a reaction mixture can correspond to substantially pure ZSM-48 crystals. Substantially pure ZSM-48 crystals are defined herein as ZSM-48 crystals that contain less than about 10 wt % of another type of zeolite, such as ZSM-50. For instance, the substantially pure ZSM-48 crystals can contain less than about 8 wt % of another type of zeolite, such as less than about 6 wt %, less than about 5 wt %, less than about 4 wt %, less than about 3 wt %, or less than about 2 wt %. Additionally or alternatively, the substantially pure ZSM-48 crystals can contain less than about 10 wt % of the combination of another type of zeolite (such as ZSM-50) and any impurities (such as Kenyaite). In such aspects, the substantially pure ZSM-48 crystals can contain less than about 8 wt % of other types of zeolite/impurities, such as less than about 6 wt %, less than about 5 wt %, less than about 4 wt %, less than about 3 wt %, or less than about 2 wt %.

In some aspects, the invention can relate to high purity ZSM-48 crystals in a particular morphology free of non-ZSM-48 seed crystals and free of ZSM-50, and a method of making the ZSM-48 composition. The ZSM-48 crystals can be "as-synthesized" crystals that still contain the organic template within the internal pore structure, can be calcined crystals, such as K-form ZSM-48 crystals and/or Li-form ZSM-48 crystals, or can be calcined and ion-exchanged crystals, such as H-form ZSM-48 crystals. By "free of non-ZSM-48 seed crystals" is meant herein that the reaction mixture used for forming the ZSM-48 does not contain any intentionally added non-ZSM-48 seed crystals. Instead, ZSM-48 crystals synthesized according to the invention can be synthesized either without the use of seed crystals or with ZSM-48 seed crystals for seeding. By "free of Kenyaite and ZSM-50" is meant herein either that Kenyaite and ZSM-50 are not intentionally added or, if any are present, their collective amount is not detectable by X-ray diffraction. Similarly, the high purity ZSM-48 according to the invention can also be advantageously free of other non-ZSM-48 crystals to the degree that such other crystals are also not detectable by X-ray diffraction. This non-detectable determination can be made on a Bruker D4 Endeavor instrument, manufactured by Bruker AXS, and equipped with a Vantec-1 high-speed detector, for example, run using a silicon powder standard (NIST 640B) which is a material without stress.

The full-width half-maximum (fwhm) for the standard peak at ~28.44 degrees 2-theta is ~0.132. The step size is ~0.01794 degrees and the time/step is ~2.0 seconds. The 2-theta scan typically uses a Cu target at ~35 kV and 45 mA.

The X-ray diffraction pattern (XRD) of the ZSM-48 crystals according to the invention is that exhibited by ZSM-48, i.e., the D-spacings and relative intensities correspond to those of substantially pure ZSM-48. While XRD can be used to establish the identity of a given zeolite, it cannot typically be used to distinguish a particular morphology. For example, the needle-like and platelet forms for a given zeolite can typically exhibit substantially similar or identical diffraction patterns. In order to distinguish between different morphologies, it may be necessary to use an analytical tool with greater resolution, such as scanning electron microscopy (SEM), photomicrographs from which can be used to identify crystals with different morphologies.

The ZSM-48 crystals, after removal of the structural directing agent (e.g., via calcination), can have a particular morphology and a molar composition according to the general formula: $(n)SiO_2:Al_2O_3$, where n can be at least about 70, at least about 80, at least about 85, or at least about 90; and/or where n can be about 110 or less, about 100 or less, or about 95 or less. In particular embodiments, n can be from about 70 to about 110, for example from about 80 to about 100 or from about 85 to about 95. Additionally or alternatively, some or all of the Si may be replaced by Ge, and/or some or all of the Al may be replaced by one or more of Ga, B, Fe, Ti, V, and/or Zr—even in these cases, the ratios given above can be for the tetravalent element (Si and/or replacement(s)) to the trivalent element (Al and/or replacement(s)).

The as-synthesized form of ZSM-48 crystals can be prepared from a mixture having silica, alumina, base, and hexamethonium salt directing agent. In an embodiment, the molar ratio of structural directing agent to silica in the mixture can be less than about 0.05, for example less than about 0.025 or less than about 0.022. Additionally or alternatively, the molar ratio of structural directing agent to silica in the mixture can be at least about 0.01, for example at least about 0.015 or at least about 0.016. Further additionally or alternatively, the molar ratio of structural directing agent to silica in the mixture can be from about 0.015 to about 0.025, for example from about 0.016 to about 0.022. In additional or alternative embodiments, the as-synthesized form of ZSM-48 crystals can have a silica to alumina molar ratio of at least about 70, for example at least about 80 or at least about 85, and/or about 110 or less, for example about 100 or less or about 95 or less, such as from about 70 to about 110. For any given preparation of the as-synthesized form of ZSM-48 crystals, the molar composition can contain silica, alumina, and directing agent. It should be noted that the as-synthesized form of ZSM-48 crystals may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

The ZSM-48 zeolite in either a calcined or as-synthesized form can typically form agglomerates of small crystals that may have crystal sizes in the range from about 0.01 to about 1 µm. These small crystals can be desirable for they generally lead to greater activity. Smaller crystals can mean greater surface area, which can lead to a greater number of active catalytic sites per given amount of catalyst.

In some aspects, the ZSM-48 crystals in either an as-synthesized or calcined form can have a morphology containing fibrous crystals. By fibrous is meant crystals that have a L/D ratio of greater than 10/1, where L and D represent the length and diameter of the average crystal. Depending on the aspect, at least about 10% of the crystals can be fibrous crystals, such as at least about 20%, at least about 30%, or at least about 40%. Additionally or alternately, the ZSM-48 crystals can have a substantially fibrous crystal morphology, such as at least about 50% of the crystals having a fibrous morphology, at least about 70%, or at least about 85%. The percentage of crystals having a given morphology or set of morphologies can be determined by counting based on, for example, SEM micrographs. Alternatively, the examination technique (such as SEM) can be used to determine that the volume of fibrous crystals corresponds to any of the above amounts. The resolution scale (1 µm) can be shown on the photomicrographs, such as those in the appended Figures.

In additional or alternative aspects, at least a portion of the ZSM-48 crystals in either an as-synthesized or calcined form can have a needle-like morphology. By needle-like is meant crystals that have a L/D ratio of less than 10/1 but substantially not spherical, for example from 2/1 to 10/1, from 3/1 to 10/1, from 5/1 to 10/1, from 2/1 to 5/1, from 3/1 to 5/1, or from 2/1 to 3/1. Depending on the aspect, at least about 10% of the crystals can have a needle-like morphology, such as at least about 20%, at least about 30%, or at least about 40%. Additionally or alternately, the ZSM-48 crystals can have a substantially needle-like crystal morphology, such as at least about 50% of the crystals having a needle-like morphology, at least about 70%, or at least about 85%. The percentage of crystals having a morphology can be determined by counting based on, for example, SEM micrographs. Alternatively, the examination technique (such as SEM) can be used to determine that the volume of needle-like crystals corresponds to any of the above amounts.

In still further additional or alternative aspects, the ZSM-48 crystals in either an as-synthesized or calcined form can include at least a combined amount of crystals having a fibrous crystal morphology and a needle-like crystal morphology. Depending on the aspect, the combined amount of crystals having a fibrous crystal morphology or a needle-like crystal morphology can be at least about 50% of the crystals, such as at least about 60% of the crystals, at least about 70%, or at least about 85%. The percentage of crystals having a morphology can be determined by counting based on, for example, SEM micrographs. Alternatively, the examination technique (such as SEM) can be used to determine that the combined volume of crystals having either fibrous or needle-like morphology corresponds to any of the above amounts. It is noted that the combined amount of crystals having a fibrous or needle-like morphology is explicitly contemplated as being combined with any of the individual amounts of fibrous crystal morphology and/or any of the individual amounts of needle-like crystal morphology combined above. Thus, in an exemplary aspect, the ZSM-48 crystals in either an as-synthesized or calcined form can be at least about 50% of the crystals, such as at least about 60% of the crystals, at least about 70%, or at least about 85%. In such an exemplary aspect, the amount of fibrous crystals can be any of the above noted amounts, such as at least about 10%, at least about 20%, at least about 30%, at least about 40%, at least about 50%, etc., and/or the amount needle-like crystals can be any of the above noted amounts, such as at least about 10%, at least about 20%, at least about 30%, at least about 40%, at least about 50%, etc.

The ZSM-48 composition can be prepared from an aqueous reaction mixture comprising silica or silicate salt, alumina or soluble aluminate salt, base, and template or directing agent. To achieve the desired crystal morphology, the reactants in reaction mixture can have the following molar ratios: $SiO_2:Al_2O_3$ from about 70 to about 110; $H_2O:SiO_2$ from about 1 to about 500; $OH^-:SiO_2$ from about 0.1 to about 0.3, for example from about 0.14 to about 0.18; and a template:$SiO_2$ from about 0.01 to about 0.05, for example from about 0.015 to about 0.025.

In the above ratios, two ranges are provided for both the base to silica ratio and the structure directing agent to silica ratio. The broader ranges for these ratios can include mixtures that can result in the formation of ZSM-48 crystals with some quantity of needle-like morphology. The preferred ranges include mixtures that can result in increased amounts of ZSM-48 crystals having fibrous morphology.

More generally, in the present method, a reaction mixture can be produced comprising a source of water, a source of an oxide of a tetravalent element, Y, selected from at least one of silicon, tin, titanium, vanadium, and germanium, a source of an oxide of trivalent element, X, selected from at least one of aluminum, boron, gallium, iron, and chromium, a source of an alkali metal and/or an alkaline earth metal, M (preferably at least including an alkali metal and preferably also not sodium), together with a source of diquat-6 cations, Q. Generally, the composition of the reaction mixture can be controlled so that the molar ratio $Q/YO_2$ in said reaction mixture is in the range from about 0.01 to about 0.05, e.g., from about 0.01 to about 0.03 or from about 0.015 to about 0.025. Additionally or alternately, the composition of the reaction mixture can be controlled to attain a composition containing one or more of the following molar ratios: $YO_2/X_2O_3$ from about 50 to about 150, e.g., from about 50 to about 120, from about 50 to about 110, from about 60 to about 150, from about 60 to about 120, from about 60 to about 110, from about 65 to about 150, from about 65 to about 120, or from about 65 to about 110; $H_2O/YO_2$ from about 1 to about 500, e.g., from about 5 to about 200, from about 5 to about 150, from about 5 to about 100, from about 5 to about 50, from about 5 to about 35, from about 10 to about 200, from about 10 to about 150, from about 10 to about 100, from about 10 to about 50, from about 10 to about 35, from about 14 to about 200, from about 14 to about 150, from about 14 to about 100, from about 14 to about 50, or from about 14 to about 35; $OH^-/YO_2$ from about 0.1 to about 0.3, e.g., from about 0.1 to about 0.25, from about 0.1 to about 0.2, from about 0.1 to about 0.18, from about 0.14 to about 3, from about 0.14 to about 0.25, from about 0.14 to about 0.2, or from about 0.14 to about 0.18; and $M/YO_2$ from about 0.05 to about 0.5, e.g., from about 0.05 to about 0.4, from about 0.05 to about 0.35, from about 0.05 to about 0.3, from about 0.05 to about 0.25, from about 0.10 to about 0.5, from about 0.10 to about 0.4, from about 0.10 to about 0.3, from about 0.10 to about 0.25, from about 0.15 to about 0.5, from about 0.15 to about 0.4, from about 0.15 to about 0.3, or from about 0.15 to about 0.25. It should be noted that, although molar ratios of $OH^-/YO_2$ are used throughout this description, it should be understood that such molar ratios are meant to encompass whatever the chemical nature of the non-detrimental counterions of M and Q, and are only expressed herein as $OH^-/YO_2$ as a shorthand notation for the alkali counterion (primarily because hydroxyl counterions were specifically used in the Examples). Similarly, where specific examples of Y, X, M, and Q are mentioned herein in molar ratios, their ranges should be understood to extend generically to the variable, unless expressly disclaimed, and not necessarily merely limited to the individual species of the variable genus.

The silica source can include (or preferably be) precipitated silica, such as commercially available from Degussa. Other silica sources can include, but are not limited to, powdered silica including precipitated silica such as Zeosil™ and silica gels, silicic acid, colloidal silica such as Ludox™, dissolved silica, or combinations thereof. In the presence of a base, some of the enumerated silica sources may form silicates. The alumina may be in the form of a soluble salt, and, in some preferable embodiments, can be a salt that does not include sodium. Suitable aluminum sources can include aluminum salts such as the chloride, aluminum alcoholates or hydrated alumina such as gamma alumina, pseudoboehmite, and colloidal alumina, or the like, or combinations thereof. The base used to dissolve the metal oxide can include any alkali (and/or alkaline earth) metal salt such as an hydroxide (preferably lithium and/or potassium hydroxide, but potentially additionally or alternately including calcium and/or magnesium hydroxide), ammonium hydroxide, diquaternary hydroxide, or the like, or combinations thereof. In some aspects, a portion of the base can be sodium hydroxide while a second portion can be an alkali metal hydroxide different from sodium. In such aspects, the mole percentage of sodium relative to the total molar amount of alkali metal can be 50% or less, such as about 25% or less, about 10% or less, about 5% or less, or about 1% or less. In other preferred aspects, the base and/or the aluminum source can be substantially free of intentionally added sodium, so that the synthesis mixture is substantially free of intentionally added sodium. Substantially free of intentionally added sodium is defined herein to correspond to a reagent or synthesis mixture where incidental sodium from a reagent of standard purity may be present. Additionally or alternately, the synthesis mixture can be substantially free of sodium, meaning that the synthesis mixture does not contain sodium to within typical detection limits for characterizing the synthesis mixture.

In various aspects, the structure directing agent can be a salt based on a diquaternary ammonium cation. In particular, the cation portion of the salt can be represented by the formula $R_1$—$R_3$—$R_2$, where $R_1$ and $R_2$ are the same or different. $R_1$ and $R_2$ can be tetraalkylammonium groups having the formula —$N^+$—RR'R", where R, R', and R" can each be alkyl groups and can each be the same or different. The R, R', and R" alkyl groups on a tetraalkylammonium group can each be an alkyl group having from 1 to 10 carbons, and preferably 4 carbons or less, such as a methyl group or an ethyl group. $R_3$ can be a polymethylene group of formula $(CH_2)_n$, where n is advantageously 6. This type of cation can be referred to as a "diquat-6" cation. One example of a diquat-6 cation is a hexamethammonium (or hexamethonium) cation, where $R_1$ and $R_2$ are the same, and R, R', and R" are each a methyl group. The anion portion of the diquat-6 salt can be chloride ions or other anions such as hydroxide, nitrate, sulfate, other halide, or the like, or combinations thereof. For example, hexamethonium chloride is N,N,N,N',N',N'-hexamethyl-1,6-hexanediammonium dichloride.

In the synthesis of the ZSM-48 crystals, the reactants including silicate salt, aluminate salt, base, and directing agent can be mixed together with water in the ratios set forth above and heated with stirring at a temperature from about 100° C. to about 250° C. The crystals may be formed from reactants or, in the alternative, ZSM-48 seed crystals may be added to the reaction mixture. The ZSM-48 seed crystals may be added to enhance the rate of crystal formation but typically should not otherwise affect crystal morphology. The preparation can be free of other non-ZSM-48 types of seed crystals such as zeolite Beta. The ZSM-48 crystals can be purified, usually by filtration, and washed with deionized water.

In various aspects, the crystals obtained from the synthesis according to the invention can have a composition that is free of non ZSM-48 seed crystals and free of ZSM-50. Additionally or alternatively, the ZSM-48 crystals can have a low quantity of Kenyaite, such as about 8 wt % or less, about 6 wt % or less, about 5 wt % or less, about 4 wt % or less, about 3 wt % or less, or about 2 wt % or less, and/or the ZSM-48 crystals can be free of detectable amounts of Kenyaite.

The as-synthesized ZSM-48 crystals can advantageously be at least partially dried prior to use or further treatment. Drying may be accomplished by heating at temperatures from about 100° C. to about 400° C., e.g., from about 100° C. to about 250° C. Pressures may be atmospheric or subatmospheric. If drying is performed under partial vacuum conditions, the temperatures may be lower than those at atmospheric pressures.

Catalysts can typically be bound with a binder or matrix material prior to use. Binders can be resistant to temperatures of the use desired and can be advantageously attrition resistant. Binders may be catalytically active or inactive and can include other zeolites, other inorganic materials such as clays and metal oxides such as alumina, silica, and/or silica-alumina, or the like, or combinations thereof. Clays may include or be kaolin, bentonite, and montmorillonite and are typically commercially available. They may be blended with other materials such as silicates, in some embodiments. Other binary porous matrix materials, in addition to silica-aluminas, can include materials such as silica-magnesia, silica-thoria, silica-zirconia, silica-beryllia, and silica-titania. Ternary materials such as silica-alumina-magnesia, silica-alumina-thoria and silica-alumina-zirconia can additionally or alternatively be suitable for use as binders. The matrix can be in the form of a co-gel. The bound ZSM-48 may range from about 10 wt % to just under 100 wt % ZSM-48, based on bound ZSM-48 with the balance being binder.

ZSM-48 crystals as part of a catalyst may optionally also be used with a metal hydrogenation component. Metal hydrogenation components may include metals from Groups 6-12 of the Periodic Table based on the IUPAC system (delineating Groups 1-18), for example from any one or more of Groups 6 and 8-10. Examples of such metals can include, but are not limited to, Ni, Mo, Co, W, Mn, Cu, Zn, Ru, Pt, or Pd (in some embodiments, containing at least Pt or Pd). Mixtures of hydrogenation metals may also be used such as Co/Mo, Ni/Mo, Ni/W, Co/W, Ni/Co/Mo, Ni/Co/W, Ni/Mo/W, Co/Mo/W, Ni/Co/Mo/W, and Pt/Pd. The amount of hydrogenation metal or metals may range from about 0.1 wt % to about 30 wt %, based on the weight of the catalyst. For example, the amount of hydrogenation metals can be at least about 0.1 wt %, at least about 0.3 wt %, at least about 0.5 wt %, at least about 0.75 wt %, at least about 1.0 wt %, at least about 1.5 wt %, at least about 2 wt %, or at least about 5 wt %. Additionally or alternatively, the amount of hydrogenation metals can be about 30 wt % or less, such as about 25 wt % or less, about 20 wt % or less, about 15 wt % or less, about 10 wt % or less, about 5 wt % or less, or about 2 wt % or less. In aspects where the hydrogenation metal(s) is(are) selected to be one or more noble metals, the amount of hydrogenation metals can preferably be about 2 wt % or less, such as about 1.5 wt % or less or about 1.0 wt % or less. Methods of loading metal onto ZSM-48 catalyst are well known and include, for example, impregnation of ZSM-48 catalyst with a metal salt of the hydrogenation component and heating. The ZSM-48 catalyst containing hydrogenation metal may optionally be sulfided prior to use. The catalyst may additionally or alternatively be steamed prior to use.

Additionally or alternatively to the aspects described above, the invention relates to high purity ZSM-48 compositions having a silica to alumina molar ratio from about 70 to about 110, the ZSM-48 being free of non-ZSM-48 seed crystals, where at least a portion of the crystals have a fiber and/or needle-like morphology. Further additionally or alternatively, the invention relates to ZSM-48 crystals that, in an as-synthesized form, comprise ZSM-48 having a silica to alumina molar ratio from about 70 to about 110 and that are formed from a reaction mixture containing a diquat-6 directing agent in a diquat-6 to silica molar ratio from about 0.01 to about 0.05 (for example from about 0.015 to about 0.025). In this embodiment, the as-synthesized ZSM-48 crystals can be free of non-ZSM-48 seed crystals and/or at least a portion of the crystals can exhibit a fibrous morphology and/or a needle-like morphology.

Such high purity and/or as-synthesized ZSM-48 crystals can be calcined thereby removing the diquat-6 structure directing agent form the internal pore structure to form high purity alkali-metal-form ZSM-48, such as ZSM-48 where the exchangeable ion sites comprise K, Li, or an alkali metal ion other than Na. This alkali-metal-form ZSM-48 can optionally but preferably also be ion exchanged to form the H-form (or active form) of ZSM-48. In particular embodiments, the as-synthesized form of ZSM-48 crystals and/or the calcined ZSM-48 (alkali-metal-form and/or H-form) crystals can be combined with at least one of a binder and hydrogenation metal.

Still further additionally or alternatively, the invention relates to a method for making ZSM-48 crystals which comprises: preparing an aqueous mixture of silica or silicate salt, alumina or aluminate salt, a diquat-6 salt, and an alkali (and/or alkaline earth) metal base, wherein the mixture has the following molar ratios: silica to alumina from about 70 to about 110, base to silica from about 0.1 to about 0.3 (e.g., from about 0.14 to about 0.18), and diquat-6 salt to silica from about 0.01 to about 0.05 (e.g., from about 0.015 to about 0.025); and heating the mixture with stirring for a time and temperature sufficient for crystal formation. Optionally, seed crystals of ZSM-48 can be added to the reaction mixture. This method can advantageously result in as-synthesized ZSM-48 crystals that contain the diquat-6 structure directing agent within the internal pore structure of the zeolite.

The ZSM-48 crystals according to the invention can have an Alpha value of at least about 10, for example at least about 20 or at least about 30. Additionally or alternatively, the Alpha value can be about 250 or less. The alpha value test is a measure of the cracking activity of a catalyst and is described in U.S. Pat. No. 3,354,078 and in the Journal of Catalysis at vol. 4, p. 527 (1965), at vol. 6, p. 278 (1966), and at vol. 61, p. 395 (1980), each incorporated herein by reference as to that description. The experimental conditions of the test used herein include a constant temperature of about 538° C. and a variable flow rate as described in detail in the Journal of Catalysis at vol. 61, p. 395.

To the extent desired, the original cations of the as-synthesized material, such as potassium and/or lithium cations, can be replaced in accordance with techniques well known in the art, at least in part, by ion exchange with other cations. Preferred replacing cations can include metal ions, hydrogen ions, hydrogen precursor (e.g., ammonium) ions, and the like, and mixtures/combinations thereof. Particularly preferred cations can be those which tailor the catalytic activity for certain hydrocarbon conversion reactions. Depending upon the desired hydrocarbon conversion reaction, these can include hydrogen, rare earth metals, and metals of Groups IIA, IIIA, IVA, VA, IB, IIB, IIIB, IVB, VB, VIB, VIIB and VIII of the Periodic Table of the Elements.

The crystalline material of this invention, when employed as an adsorbent and/or as a catalyst in an organic compound conversion process, can typically be dehydrated, at least partially. This can be done by heating to a temperature in the range from about 150° C. to about 370° C. (e.g., from about 200° C. to about 370° C.) in an oxidizing atmosphere (e.g., air) and/or in an inert atmosphere (e.g., nitrogen), at atmospheric or subatmospheric pressures for a sufficient time, such as between 30 minutes and 48 hours. Dehydration can alternatively be performed at room temperature merely by placing the zeolite composition in a vacuum and/or can be performed at superatmospheric pressures, but a longer time can be required to obtain a sufficient amount of dehydration in such cases.

Optionally, instead of or in addition to dehydration, the crystals can be calcined at a temperature from about 200° C. to about 925° C. (e.g., from about 350° C. to about 925° C.) for a sufficient time, such as from about 1 minute to about 30 minutes. To reach the calcination temperature, the temperature of the oven or other device for heating the crystals can be raised in increments of 50° C., 100° C., or another convenient increment. The crystals can be held at the incremental temperatures for a period of time prior to continuing to increase the temperature to the desired final calcination temperature. The incremental heating can allow water vapor (not released during dehydration, if performed separately) to exit the crystal structure while reducing and/or minimizing damage and/or morphology changes in the crystals.

The crystalline molecular sieve produced by the present process can be used to catalyze a wide variety of organic compound conversion processes including many of present commercial/industrial importance. Examples of chemical conversion processes effectively catalyzed by the crystalline material of this invention, by itself or in combination with one or more other catalytically active substances including other crystalline catalysts, can include those requiring a catalyst with acid activity. Specific examples can include, but are not limited to:

(a) alkylation of aromatics with short chain ($C_2$-$C_6$) olefins, e.g., alkylation of ethylene or propylene with benzene to produce ethylbenzene or cumene respectively, in the gas or liquid phase, with reaction conditions optionally including one or more of a temperature from about 10° C. to about 250° C., a pressure from about 0 psig to about 500 psig (about 3.5 MPag), a total weight hourly space velocity (WHSV) from about 0.5 $hr^{-1}$ to about 100 $hr^{-1}$, and an aromatic/olefin mole ratio from about 0.1 to about 50;

(b) alkylation of aromatics with long chain (C.sub.10-C.sub.20) olefins, in the gas or liquid phase, with reaction conditions optionally including one or more of a temperature from about 250° C. to about 500° C., a pressure from about 0 psig to 500 psi, (about 3.5 MPag), a total WHSV from about 0.5 $hr^{-1}$ to about 50 $hr^{-1}$, and an aromatic/olefin mole ratio from about 1 to about 50;

(c) transalkylation of aromatics, in gas or liquid phase, e.g., transalkylation of polyethylbenzenes and/or polyisopropylbenzenes with benzene to produce ethylbenzene and/or cumene respectively, with reaction conditions optionally including one or more of a temperature from about 100° C. to about 500° C., a pressure from about 1 psig (about 7 kPag) to about 500 psig (about 3.5 MPag), and a WHSV from about 1 $hr^{-1}$ to about 10,000 $hr^{-1}$;

(d) disproportionation of alkylaromatics, e.g., disproportionation of toluene to produce xylenes, with reaction conditions optionally including one or more of a temperature from about 200° C. to about 760° C., a pressure from about 1 atm (about 0 psig) to about 60 atm (about 5.9 MPag), a WHSV from about 0.1 $hr^{-1}$ to about 20 $hr^{-1}$, and a hydrogen/hydrocarbon mole ratio from 0 (no added hydrogen) to about 50;

(e) dealkylation of alkylaromatics, e.g., deethylation of ethylbenzene, with reaction conditions optionally including one or more of a temperature from about 200° C. to about 760° C., a pressure from about 1 atm (about 0 psig) to about 60 atm (about 5.9 MPag), a WHSV from about 0.1 $hr^{-1}$ to about 20 $hr^{-1}$, and a hydrogen to hydrocarbon mole ratio from 0 (no added hydrogen) to about 50;

(f) isomerization of alkylaromatics, such as xylenes, with reaction conditions optionally including one or more of a temperature from about 200° C. to about 540° C., a pressure from about 100 kPaa to about 7 MPaa, a WHSV from about 0.1 $hr^{-1}$ to about 50 $hr^{-1}$, and a hydrogen/hydrocarbon mole ratio from 0 (no added hydrogen) to about 10;

(g) reaction of paraffins with aromatics, e.g., to form alkylaromatics and light gases, with reaction conditions optionally including one or more of a temperature from about 260° C. to about 375° C., a pressure from about 0 psig to about 1000 psig (about 6.9 MPag), a WHSV from about 0.5 $hr^{-1}$ to about 10 $hr^{-1}$, and a hydrogen/hydrocarbon mole ratio from 0 (no added hydrogen) to about 10;

(h) paraffin isomerization to provide branched paraffins with reaction conditions optionally including one or more of a temperature from about 200° C. to about 315° C., a pressure from about 100 psig (about 690 kPag) to about 1000 psig (about 6.9 MPag), a WHSV from about 0.5 $hr^{-1}$ to about 10 $hr^{-1}$, and a hydrogen to hydrocarbon mole ratio from about 0.5 to about 10;

(i) alkylation of iso-paraffins, such as isobutane, with olefins, with reaction conditions optionally including one or more of a temperature from about −20° C. to about 350° C., a pressure from about 0 psig to about 700 psig (about 4.9 MPag), and a total olefin WHSV from about 0.02 $hr^{-1}$ to about 10 $hr^{-1}$;

(j) dewaxing of paraffinic feeds with reaction conditions optionally including one or more of a temperature from about 200° C. to about 450° C., a pressure from about 0 psig to about 1000 psig (about 6.9 MPag), a WHSV from about 0.2 $hr^{-1}$ to about 10 $hr^{-1}$, and a hydrogen/hydrocarbon mole ratio from about 0.5 to about 10;

(k) cracking of hydrocarbons with reaction conditions optionally including one or more of a temperature from about 300° C. to about 700° C., a pressure from about 0.1 atm (about 10 kPag) to about 30 atm (about 3 MPag), and a WHSV from about 0.1 $hr^{-1}$ to about 20 $hr^{-1}$;

(l) isomerization of olefins with reaction conditions optionally including one or more of a temperature from about 250° C. to about 750° C., an olefin partial pressure from about 30 kPa to about 300 kPa, and a WHSV from about 0.5 $hr^{-1}$ to about 500 $hr^{-1}$; and (m) a hydrocarbon trap (e.g., pre-catalytic converter adsorbent) for cold start emissions in motor vehicles.

Other Embodiments

Additionally or alternatively, the present invention can include one or more of the following embodiments.

Embodiment 1

A method of synthesizing ZSM-48 crystals, at least 25 vol % of the as-synthesized crystals having a fiber morphology, a needle-like morphology, or a combination thereof, the method comprising crystallizing a reaction mixture comprising a source of water, a source of an oxide of a tetravalent element Y, a source of an oxide of a trivalent element X, a source of an alkali and/or alkaline earth metal, M, the alkali and/or alkaline earth metal comprising Li, K, Ca, Mg, or a combination thereof, and a source of a structure directing agent in the form of an organic cation, Q, having the structure $R_1-R_3-R_2$, the reaction mixture having a molar ratio of structure directing agent cation, Q, to oxide of tetravalent element Y in said reaction mixture from about 0.01 to about 0.05; a molar ratio of oxide of tetravalent element Y to oxide of trivalent element X in said reaction mixture from about 50 to about 120; a molar ratio of water to oxide of tetravalent element X in said reaction mixture from about 1 to about 500; a molar ratio of hydroxyl group concentration to oxide of tetravalent element X in said reaction mixture from about 0.1 to about 0.3; and a molar ratio of alkali and/or alkaline earth metal, M, to oxide of tetravalent element X in said reaction mixture from about 0.05 to about 0.4, where $R_1$ and $R_2$ are the same or different, $R_1$ and $R_2$ representing tetraalkylammonium groups having the formula $-N^+-RR'R''$, where R, R', and R'' are each the same or different, the R, R', and R'' alkyl groups each being an alkyl group having from 1 to 10 carbons, and where $R_3$ is a polymethylene group of formula $(CH_2)_n$, where n=6.

Embodiment 2

The method of Embodiment 1, wherein Y selected from at least one of silicon, tin, titanium, vanadium, and germanium and/or X is selected from at least one of aluminum, boron, gallium, iron, and chromium.

Embodiment 3

A method of synthesizing ZSM-48 crystals, at least 25 vol % of the as-synthesized crystals having a fiber morphology, a needle-like morphology, or a combination thereof, the method comprising crystallizing a reaction mixture comprising a source of water, a source of $SiO_2$, a source of $Al_2O_3$, a source of an alkali metal, M, the alkali metal being Li, K, or a combination thereof, and a source of a structure directing agent in the form of an organic cation, Q, having the structure $R_1-R_3-R_2$, the reaction mixture having a molar ratio of structure directing agent cation, Q, to $SiO_2$ in said reaction mixture from about 0.01 to about 0.05; a molar ratio of $SiO_2$ to $Al_2O_3$ in said reaction mixture from about 50 to about 120; a molar ratio of water to $SiO_2$ in said reaction mixture from about 1 to about 500; a molar ratio of hydroxyl group concentration to $SiO_2$ in said reaction mixture from about 0.1 to about 0.3; and a molar ratio of alkali metal, M, to $SiO_2$ in said reaction mixture from about 0.05 to about 0.4, where $R_1$ and $R_2$ are the same or different, $R_1$ and $R_2$ representing tetraalkylammonium groups having the formula $-N^+-RR'R''$, where R, R', and R'' are each the same or different, the R, R', and R'' alkyl groups each being an alkyl group having from 1 to 10 carbons, and where $R_3$ is a polymethylene group of formula $(CH_2)_n$, where n=6.

Embodiment 4

A porous crystalline composition, comprising a crystalline material having a ZSM-48 framework structure, the crystalline material having a ratio of $SiO_2:Al_2O_3$ from about 70 to about 110, at least 25% of the crystalline material having a fibrous morphology; and a structure directing agent within the pore structure of the crystalline material, the structure directing agent comprising a salt of an organic cation having the structure $R_1-R_3-R_2$, a molar ratio of structure directing agent to $SiO_2$ being about 0.015 to about 0.025, where $R_1$ and $R_2$ are the same or different, $R_1$ and $R_2$ representing tetraalkylammonium groups having the formula $-N^+-RR'R''$, where R, R', and R'' are each the same or different, the R, R', and R'' alkyl groups each being an alkyl group having from 1 to 10 carbons, and where $R_3$ is a polymethylene group of formula $(CH_2)_n$, where n=6.

Embodiment 5

A porous crystalline composition, comprising, a crystalline material having a ZSM-48 framework structure, the crystalline material having a ratio of $SiO_2:Al_2O_3$ from about 70 to about 110, at least 25% of the crystalline material having a fibrous morphology, a needle morphology, or a combination thereof, the material made by process comprising crystallizing a reaction mixture comprising a source of water, a source of $SiO_2$, a source of $Al_2O_3$, a source of an alkali metal, M, the alkali metal being Li, K, or a combination thereof, and a source of a structure directing agent in the form of an organic cation, Q, having the structure $R_1-R_3-R_2$, the reaction mixture having a molar ratio of structure directing agent cation, Q, to $SiO_2$ in said reaction mixture from about 0.01 to about 0.05; a molar ratio of $SiO_2$ to $Al_2O_3$ in said reaction mixture from about 50 to about 120; a molar ratio of water to $SiO_2$ in said reaction mixture from about 1 to about 500; a molar ratio of hydroxyl group concentration to $SiO_2$ in said reaction mixture from about 0.1 to about 0.3; and a molar ratio of alkali metal, M, to $SiO_2$ in said reaction mixture from about 0.05 to about 0.4, where $R_1$ and $R_2$ are the same or different, $R_1$ and $R_2$ representing tetraalkylammonium groups having the formula $-N^+-RR'R''$, where R, R', and R'' are each the same or different, the R, R', and R'' alkyl groups each being an alkyl group having from 1 to 10 carbons, and where $R_3$ is a polymethylene group of formula $(CH_2)_n$, where n=6.

Embodiment 6

The method or composition of any of the above embodiments, wherein R, R', and R'' are alkyl groups containing 4 carbons or less.

Embodiment 7

The method or composition of any of the above embodiments, wherein R, R', and R'' are methyl groups, ethyl groups, or combinations thereof.

Embodiment 8

The method or composition of any of the above embodiments, wherein the reaction mixture further comprises seeds of ZSM-48 in an amount such that a weight percent of seeds relative to total weight of $SiO_2$ in said reaction mixture is between about 0.1 wt % and about 20 wt %.

Embodiment 9

The method or composition of any of the above embodiments, wherein the reaction mixture has a molar ratio of structure directing agent cation, Q, to $SiO_2$ in said reaction mixture from about 0.015 to about 0.025 and a molar ratio of hydroxyl group concentration to $SiO_2$ in said reaction mixture from about 0.14 to about 0.18.

Embodiment 10

The method or composition of any of the above embodiments, wherein the alkali metal, M, comprises substantially no sodium.

Embodiment 11

The method or composition of any of the above embodiments, wherein the synthesis mixture comprises substantially no intentionally added sodium.

Embodiment 12

The method or composition of any of the above embodiments, wherein at least 50 vol % of the as-synthesized ZSM-48 crystals have a fibrous morphology.

Embodiment 13

The method or composition of any of the above embodiments, wherein at least 50 vol % of the as-synthesized ZSM-48 crystals have a needle-like morphology.

Embodiment 14

The method or composition of any of the above embodiments wherein at least 50 vol % of the as-synthesized ZSM-48 crystals have a fibrous morphology and/or a needle-like morphology.

EXAMPLES

Comparative Example 1

Preparation of ZSM-48 with $Si/Al_2$ of ~90:1 Using NaOH

A mixture was prepared from about 1027 grams of water, about 45 g of Hexamethonium Chloride (~56% solution), about 270 grams of Ultrasil™ PM, about 15 grams of sodium aluminate solution (~45%), about 46 grams of ~50% sodium hydroxide solution, and about 10 grams of ZSM-48 seeds. The mixture had the following molar composition:

TABLE 1

| Reactants | Molar ratio |
| --- | --- |
| $SiO_2/Al_2O_3$ | ~100 |
| $H_2O/SiO_2$ | ~15 |
| $OH^-/SiO_2$ | ~0.16 |
| $Na^+/SiO_2$ | ~0.16 |
| Template/$SiO_2$ | ~0.021 |

Figure 1B:
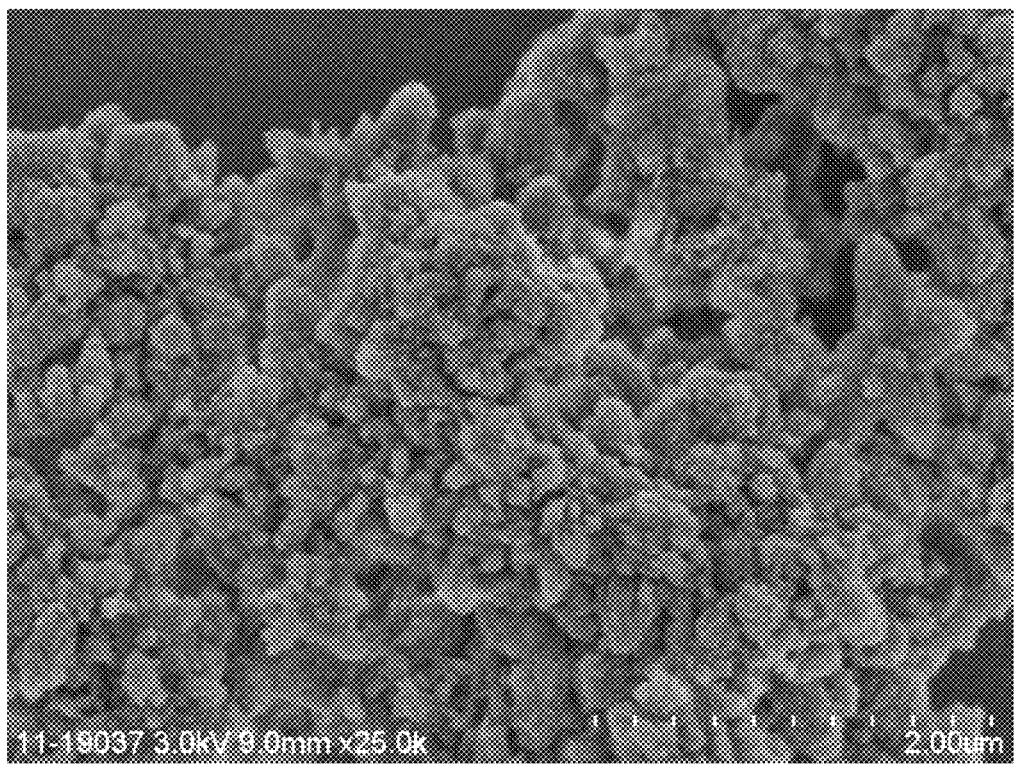
FIG. 1B shows SEM images of ZSM-48 crystals made according to a prior art method.

The mixture was reacted at about 320° F. (about 160° C.) in a ~2-liter autoclave with stirring at about 250 RPM for about 48 hours. The product was filtered, washed with deionized (DI) water, and dried at about 250° F. (about 120° C.). As shown in FIG. 1a, the XRD pattern of the as-synthesized material showed the typical pure phase of ZSM-48 topology. FIG. 1b shows an SEM of the as-synthesized material, which shows that the material was composed of agglomerates of crystals with mixed morphologies, including needle-like and irregularly shaped crystals. The resulting ZSM-48 crystals had a $SiO_2/Al_2O_3$ molar ratio of ~100/1. The as-synthesized crystals were converted into the hydrogen form by three ion exchanges with ammonium nitrate solution at room temperature (~20-25° C.), followed by drying at about 250° F. (about 120° C.) and calcination at about 1000° F. (about 540° C.) for about 6 hours. The resulting ZSM-48 crystals had a $SiO_2/Al_2O_3$ molar ratio of about 90/1, an Alpha value of ~80, a surface area of about 281 $m^2/g$, and an n-hexane sorption of about 42.1 mg/g.

Example 2

Preparation of ZSM-48 w $Si/Al_2$~90/1 from LiOH (0.038 Template/Si)

A mixture was prepared from about 1100 grams of water, about 62 grams of Hexamethonium Chloride (~56% solution), about 217 grams of Ultrasil™ PM, about 38 grams of aluminum sulfate (~47%), about 42 grams of $LiOH.H_2O$, and about 10 grams of ZSM-48 seeds. The mixture had the following molar composition:

TABLE 2

| Reactants | Molar ratio |
| --- | --- |
| $SiO_2/Al_2O_3$ | ~103 |
| $H_2O/SiO_2$ | ~19.4 |
| $OH^-/SiO_2$ | ~0.171 |
| $Li^+/SiO_2$ | ~0.142 |
| Template/$SiO_2$ | ~0.038 |

Figure 2B:
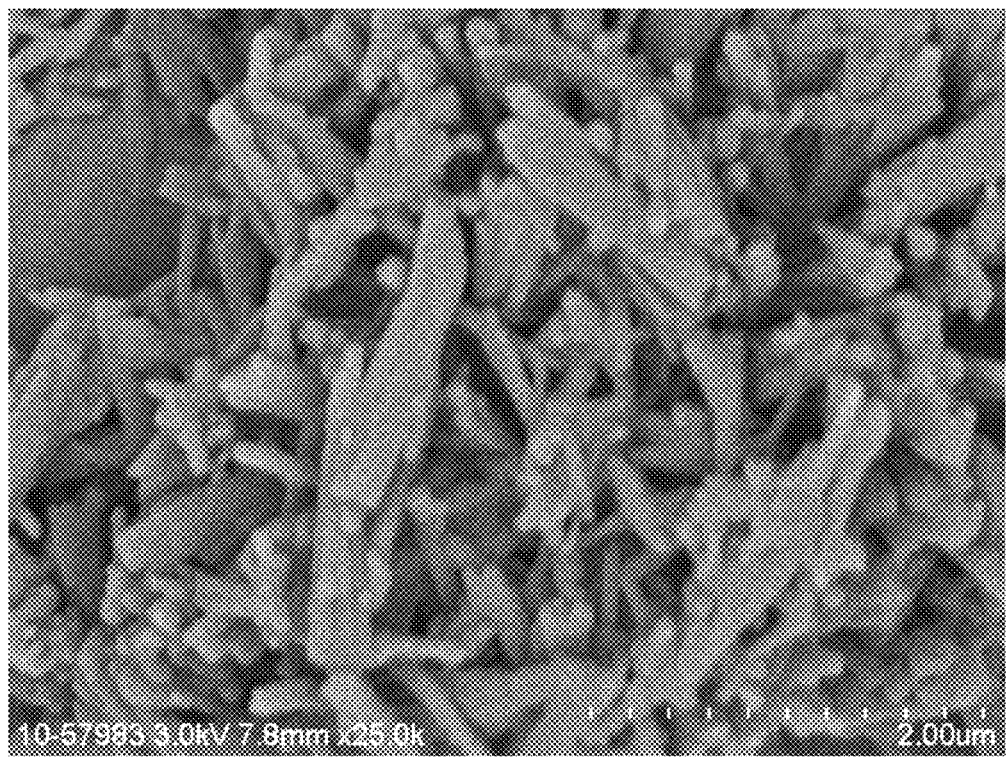
FIG. 2B shows SEM images of ZSM-48 crystals made according to a method described herein.
Figure 2A:
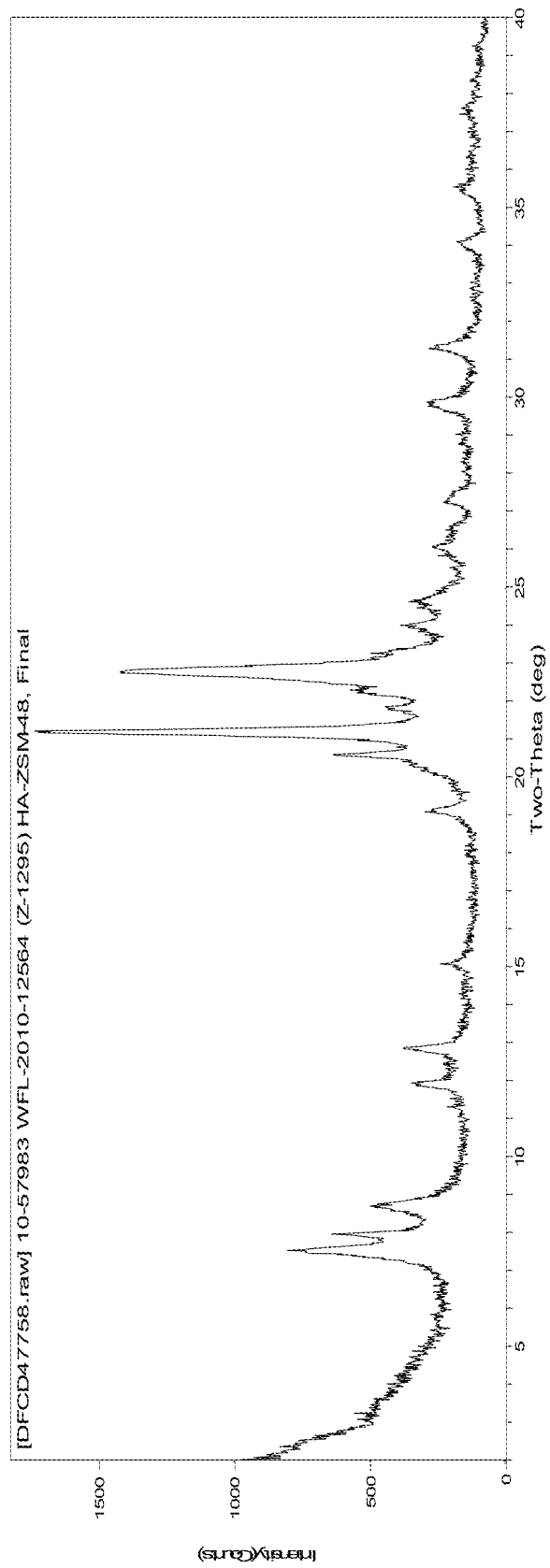
FIG. 2A shows an XRD plot of ZSM-48 crystals made according to a method described herein.

The mixture was reacted at about 320° F. (about 160° C.) in a ~2-liter autoclave with stirring at about 250 RPM for about 48 hours. The product was filtered, washed with deionized (DI) water, and dried at about 250° F. (about 120° C.). As shown in FIG. 2a, the XRD pattern of the as-synthesized material showed a mixture of phases including ZSM-48 and other phases. FIG. 2b shows an SEM of the as-synthesized material, which shows that the material was composed of agglomerates of needle shaped crystals. The resulting ZSM-48 crystals had a $SiO_2/Al_2O_3$ molar ratio of ~99/1. The as-synthesized crystals were converted into the hydrogen form by three ion exchanges with ammonium nitrate solution at room temperature, followed by drying at about 250° F. (about 120° C.) and calcination at about 1000° F. (about 540° C.) for about 6 hours. The resulting ZSM-48 crystals had an Alpha value of about 1.3, a surface area of about 197 $m^2/g$, and an n-hexane sorption of about 32.3 mg/g. Based on the results, it is believed that the ion-exchanging procedure described above did not lead to full conversion of the ZSM-48 crystals to an H-form product.

Example 3

Preparation of ZSM-48 w $Si/Al_2$~90/1 from LiOH (0.021 Template/Si)

A mixture was prepared from about 1100 grams of water, about 34 grams of Hexamethonium Chloride (56% solution), about 217 grams of Ultrasil™ PM, about 38 grams of aluminum sulfate (47%), about 42 grams of LiOH.H$_2$O, and about 10 grams of ZSM-48 seeds. The mixture had the following molar composition:

TABLE 3

| Reactants | Molar ratio |
| --- | --- |
| SiO$_2$/Al$_2$O$_3$ | ~103 |
| H$_2$O/SiO$_2$ | ~19.4 |
| OH$^-$/SiO$_2$ | ~0.171 |
| Li$^+$/SiO$_2$ | ~0.142 |
| Template/SiO$_2$ | ~0.021 |

Figure 3A:
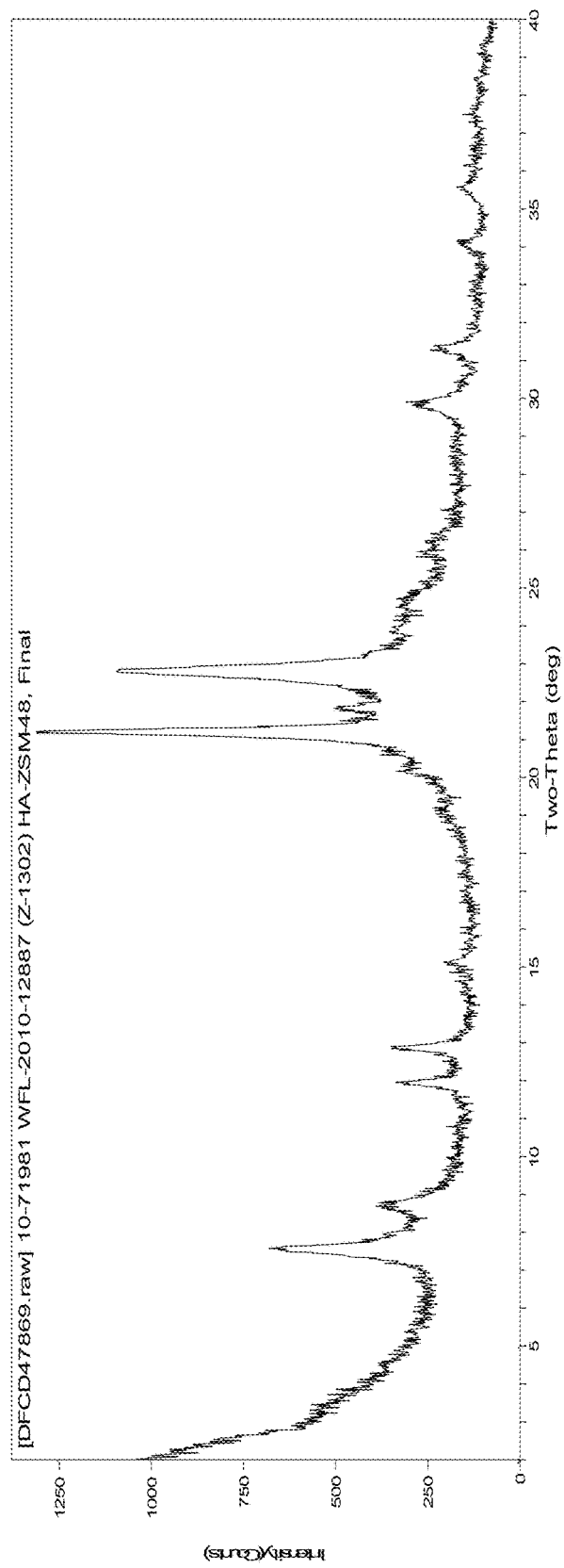
FIG. 3A shows an XRD plot of ZSM-48 crystals made according to a method according to the invention.
Figure 3B:
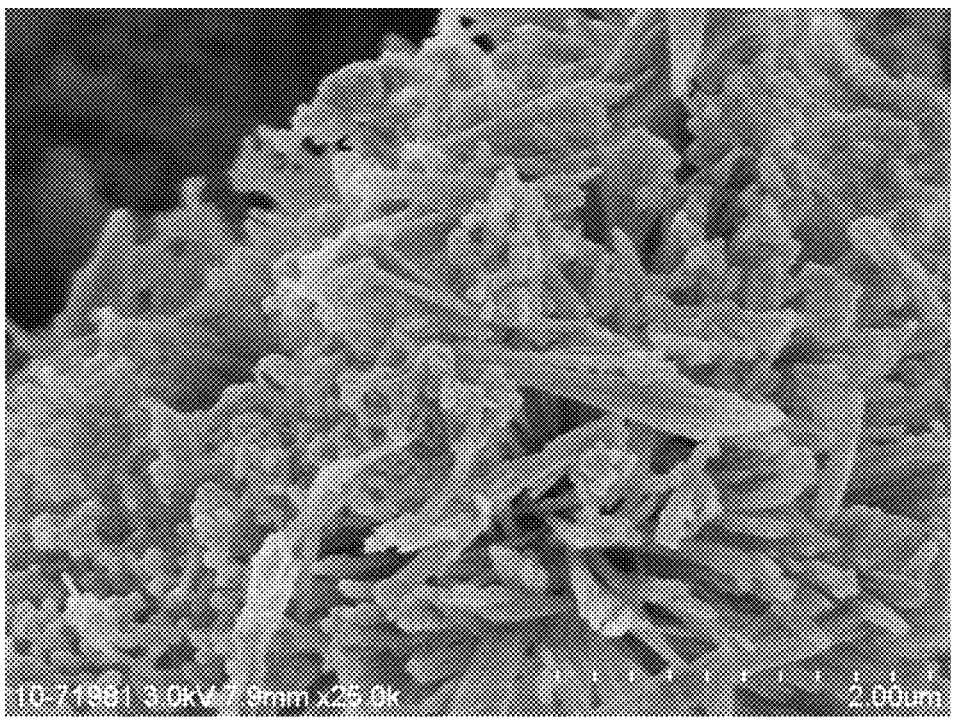
FIG. 3B shows an XRD plot of ZSM-48 crystals made according to a method according to the invention.

The mixture was reacted at about 320° F. (about 160° C.) in a ~2-liter autoclave with stirring at about 250 RPM for about 48 hours. The product was filtered, washed with deionized (DI) water, and dried at about 250° F. (about 120° C.). As shown in FIG. 3a, the XRD pattern of the as-synthesized material showed the mixed phases of ZSM-48 and unknown phases. FIG. 3b shows an SEM of the as-synthesized material, which shows that the material was composed of agglomerates of fibrous shaped crystals. The resulting ZSM-48 crystals had a SiO$_2$/Al$_2$O$_3$ molar ratio of ~99/1.

Example 4

Preparation of ZSM-48 w Si/Al$_2$~70/1 from LiOH (0.038 Template/Si)

A mixture was prepared from about 1100 grams of water, about 62 grams of Hexamethonium Chloride (~56% solution), about 217 grams of Ultrasil™ PM, about 56 grams of aluminum sulfate (~47%), about 42 grams of LiOH.H$_2$O, and about 10 grams of ZSM-48 seeds. The mixture had the following molar composition:

TABLE 4

| Reactants | Molar ratio |
| --- | --- |
| SiO$_2$/Al$_2$O$_3$ | ~70.3 |
| H$_2$O/SiO$_2$ | ~19.4 |
| OH$^-$/SiO$_2$ | ~0.171 |
| Li$^+$/SiO$_2$ | ~0.142 |
| Template/SiO$_2$ | ~0.038 |

Figure 4:
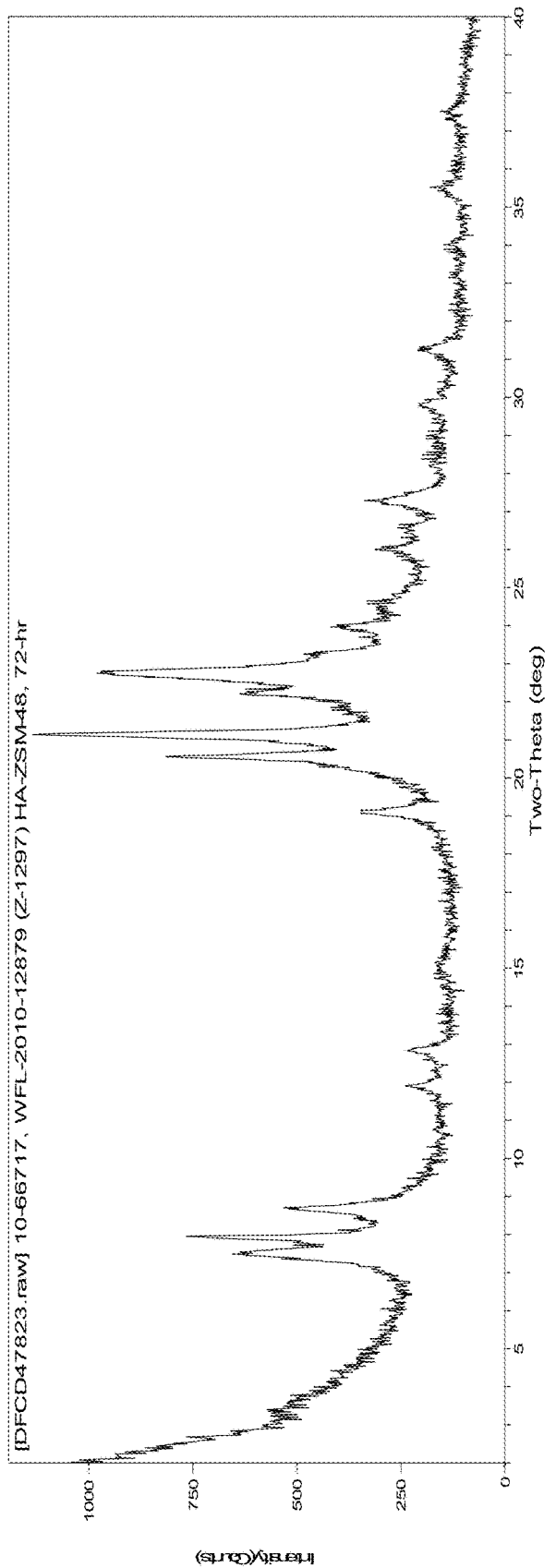
FIG. 4 shows SEM images of ZSM-48 crystals made according to a method according to the invention.

The mixture was reacted at about 320° F. (about 160° C.) in a ~2-liter autoclave with stirring at about 250 RPM for 72 hours. The product was filtered, washed with deionized (DI) water, and dried at about 250° F. (about 120° C.). As shown in FIG. 4, the XRD pattern of the as-synthesized material showed a mixture of phases including ZSM-48 and unknown phases.

Example 5

Preparation of ZSM-48 w Si/Al$_2$~90/1 from KOH (0.038 Template/Si)

A mixture was prepared from about 1100 grams of water, about 62 grams of Hexamethonium Chloride (~56% solution), about 217 grams of Ultrasil™ PM, about 38 grams of aluminum sulfate (~47%), about 57 grams of ~45.5% potassium hydroxide solution, and about 10 grams of ZSM-48 seeds. The mixture had the following molar composition:

TABLE 5

| Reactants | Molar ratio |
| --- | --- |
| SiO$_2$/Al$_2$O$_3$ | ~104 |
| H$_2$O/SiO$_2$ | ~19.4 |
| OH$^-$/SiO$_2$ | ~0.171 |
| K$^+$/SiO$_2$ | ~0.142 |
| Template/SiO$_2$ | ~0.038 |

Figure 5B:
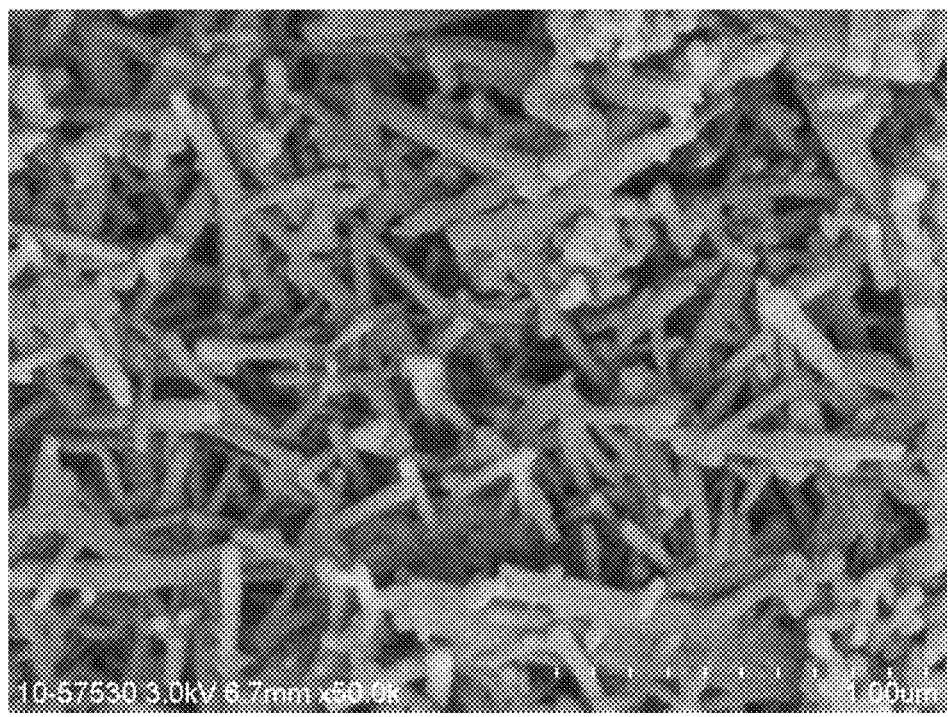
FIG. 5B shows SEM images of ZSM-48 crystals made according to a method according to the invention.
Figure 5A:
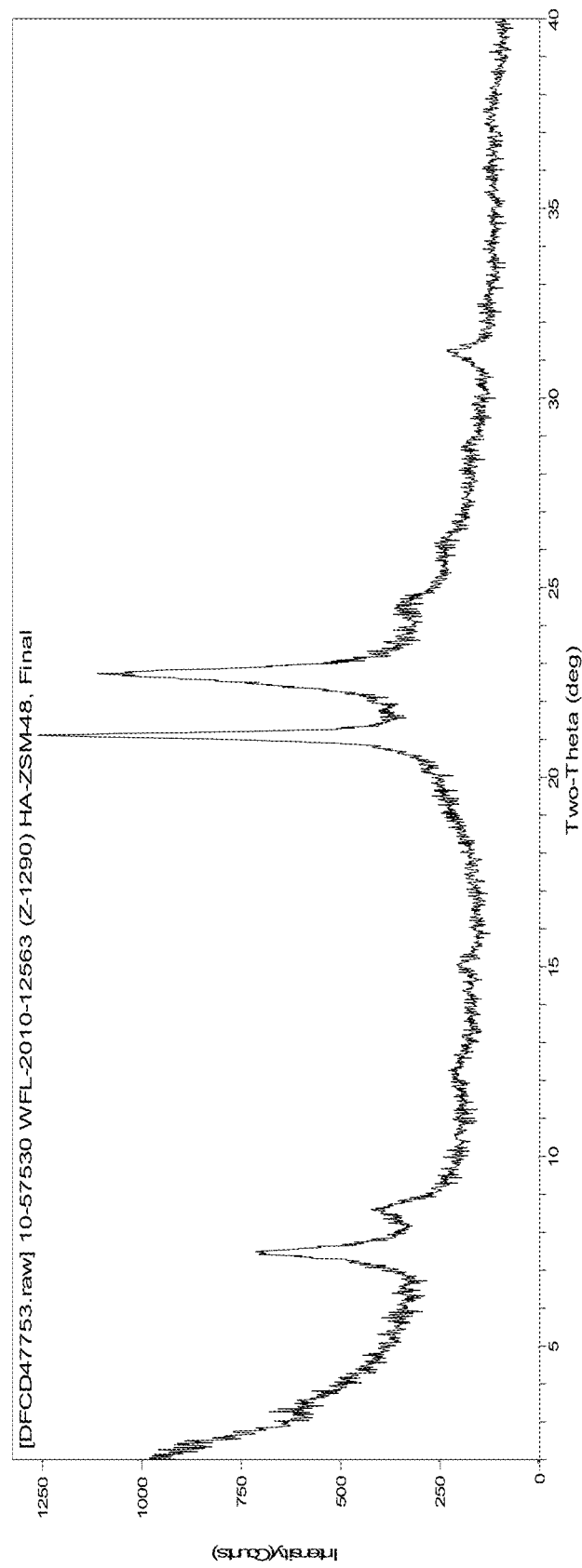
FIG. 5A shows an XRD plot of ZSM-48 crystals made according to a method according to the invention.

The mixture was reacted at about 320° F. (about 160° C.) in a ~2-liter autoclave with stirring at about 250 RPM for 72 hours. The product was filtered, washed with deionized (DI) water, and dried at about 250° F. (about 120° C.). As shown in FIG. 5a, the XRD pattern of the as-synthesized material showed the typical pure phase of ZSM-48 topology. FIG. 5b shows an SEM of the as-synthesized material, which shows that the material was substantially needle-like morphology. The resulting ZSM-48 crystals had a SiO$_2$/Al$_2$O$_3$ molar ratio of ~92/1. The as-synthesized crystals were converted into the hydrogen form by three ion exchanges with ammonium nitrate solution at room temperature, followed by drying at about 250° F. (about 120° C.) and calcination at about 1000° F. (about 540° C.) for about 6 hours. The resulting ZSM-48 crystals had an Alpha value of about 35, a surface area of about 217/(138+79) m$^2$/g, and an n-hexane sorption of about 30.7 mg/g.

Example 6

Preparation of ZSM-48 w Si/Al$_2$~90/1 from KOH (0.021 Template/Si)

A mixture was prepared from about 1100 grams of water, about 34 grams of Hexamethonium Chloride (~56% solution), about 217 grams of Ultrasil™ PM, about 38 grams of aluminum sulfate (~47%), about 57 grams of ~45.5% potassium hydroxide solution, and about 10 grams of ZSM-48 seeds. The mixture had the following molar composition:

TABLE

| Example 6 | |
| --- | --- |
| Reactants | Molar ratio |
| SiO$_2$/Al$_2$O$_3$ | ~103 |
| H$_2$O/SiO$_2$ | ~19.4 |
| OH$^-$/SiO$_2$ | ~0.171 |
| K$^+$/SiO$_2$ | ~0.142 |
| Template/SiO$_2$ | ~0.021 |

Figure 6A:
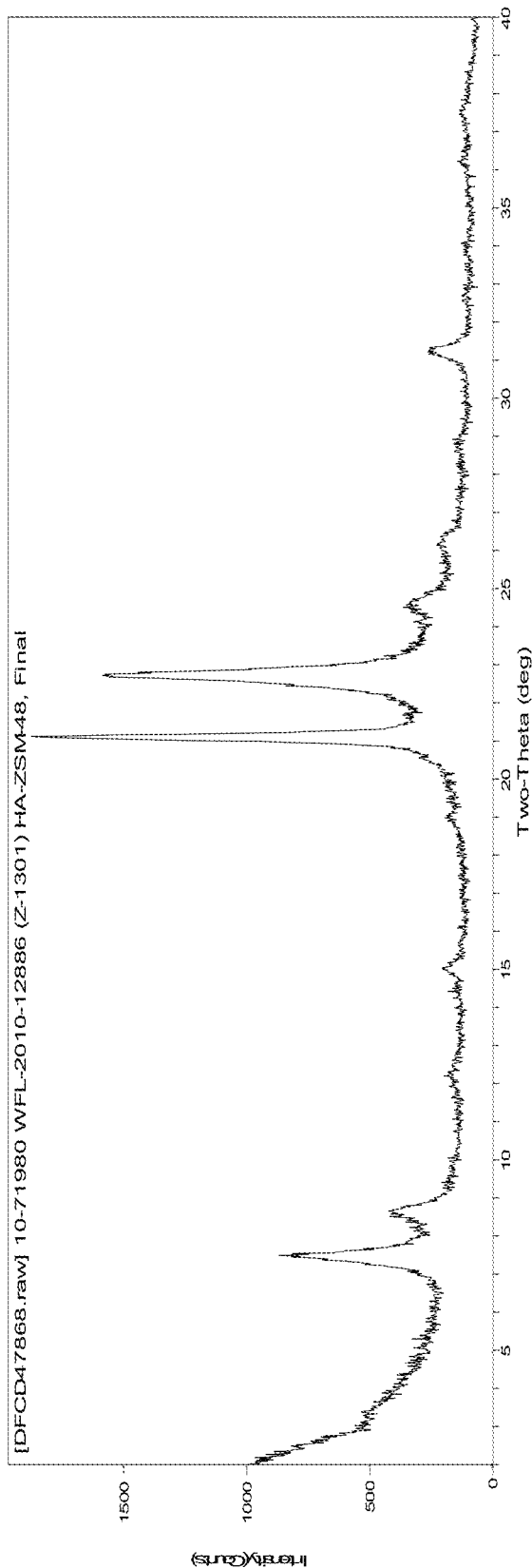
FIG. 6A shows an XRD plot of ZSM-48 crystals made according to a method according to the invention.
Figure 6B:
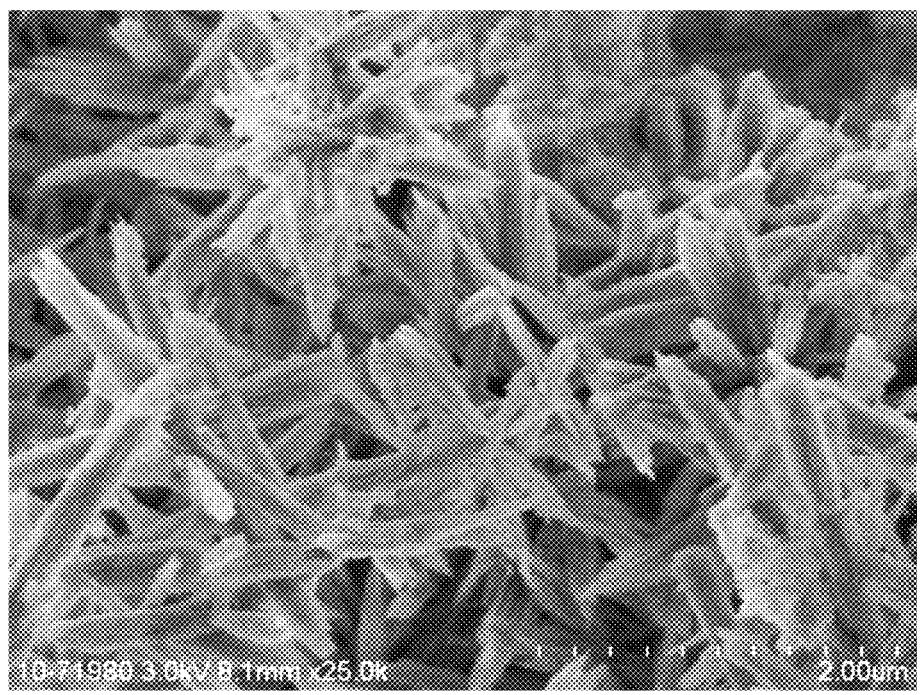
FIG. 6B shows SEM images of ZSM-48 crystals made according to a method according to the invention.

The mixture was reacted at about 320° F. (about 160° C.) in a ~2-liter autoclave with stirring at about 250 RPM for about 72 hours. The product was filtered, washed with deionized (DI) water, and dried at about 250° F. (about 120° C.). As shown in FIG. 6a, the XRD pattern of the as-synthesized material showed the typical pure phase of ZSM-48 topology. FIG. 6b shows an SEM of the as-synthesized material, which shows that the material was composed of agglomerates of crystals with fibrous morphology. The resulting ZSM-48 crystals had a SiO$_2$/Al$_2$O$_3$ molar ratio of ~95/1.

Example 7

Preparation of ZSM-48 w Si/Al$_2$~90/1 from Mixed KOH/NaOH Sols

A mixture was prepared from about 984 grams of water, about 42 grams of Hexamethonium Chloride (~56% solution), about 267 grams of Ultrasil™ PM, about 48 grams of ~47% AlSO$_4$ sol, about 70 grams of ~45.5 wt % KOH sol, about 14.5 grams of ~50% NaOH sol, and about 10 grams of ZSM-48 seeds. The mixture had the following molar composition:

TABLE

Example 7

| Reactants | Molar ratio |
| --- | --- |
| SiO$_2$/Al$_2$O$_3$ | ~100 |
| H$_2$O/SiO$_2$ | ~14.9 |
| Na$^+$/SiO$_2$ | ~0.044 |
| K$^+$/SiO$_2$ | ~0.139 |
| Template/SiO$_2$ | ~0.021 |

The mixture was reacted at about 320° F. (about 160° C.) in a ~2-liter autoclave with stirring at about 250 RPM for about 72 hours. The product was filtered, washed with deionized (DI) water, and dried at about 250° F. (about 120° C.). As shown in FIG. 7, the XRD pattern of the as-synthesized material showed the typical ZSM-48 topology with some Kenyaite impurity.

Example 8

Preparation of ZSM-48 w Si/Al$_2$~90/1 from Mixed KOH/NaOH Sols

A mixture was prepared from about 984 grams of water, about 42 grams of Hexamethonium Chloride (~56% solution), about 267 grams of Ultrasil™ PM, about 48 grams of ~47% AlSO$_4$ sol, about 50 grams of ~45.5 wt % KOH sol, about 25 grams of ~50% NaOH sol, and about 10 grams of ZSM-48 seeds. The mixture had the following molar composition:

TABLE

Example 8

| Reactants | Molar ratio |
| --- | --- |
| SiO$_2$: Al$_2$O$_3$ | ~100 |
| H$_2$O: SiO$_2$ | ~14.9 |
| Na$^+$: SiO$_2$ | ~0.076 |
| K$^+$/SiO$_2$ | ~0.100 |
| Template/SiO$_2$ | ~0.021 |

The mixture was reacted at about 320° F. (about 160° C.) in a ~2-liter autoclave with stirring at about 250 RPM for about 72 hours. The product was filtered, washed with deionized (DI) water and dried at about 250° F. (about 120° C.).

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

What is claimed is:

1. A method of synthesizing ZSM-48 crystals, at least 25 vol % of the as-synthesized crystals having a fiber morphology, a needle-like morphology, or a combination thereof, the method comprising:
   crystallizing a reaction mixture comprising a source of water, a source of SiO$_2$, a source of Al$_2$O$_3$, a source of an alkali metal, M, the alkali metal being Li, K, or a combination thereof, and a source of a structure directing agent in the form of an organic cation, Q, having the structure R$_1$—R$_3$—R$_2$,
   the reaction mixture having a molar ratio of structure directing agent cation, Q, to SiO$_2$ in said reaction mixture of about 0.01 to about 0.05; a molar ratio of SiO$_2$ to Al$_2$O$_3$ in said reaction mixture of about 50 to about 120; a molar ratio of water to SiO$_2$ in said reaction mixture of about 1 to about 500; a molar ratio of hydroxyl group concentration to SiO$_2$ in said reaction mixture is from about 0.1 to about 0.3; and a molar ratio of alkali metal, M, to SiO$_2$ in said reaction mixture is from about 0.05 to about 0.4,
   where R$_1$ and R$_2$ are the same or different, R$_1$ and R$_2$ being tetraalkylammonium groups having the formula —N$^+$—RR'R",
   where R, R', and R" are each the same or different, the R, R', and R" alkyl groups each being an alkyl group having from 1 to 10 carbons, and
   where R$_3$ is a polymethylene group of formula (CH$_2$)$_n$, where n=6.

2. The method of claim 1, wherein R, R', and R" are methyl groups, ethyl groups, or combinations thereof.

3. The method of claim 1, wherein R, R', and R" are alkyl groups containing 4 carbons or less.

4. The method of claim 1, wherein the reaction mixture further comprises seeds of ZSM-48 in an amount such that a weight percent of seeds relative to total weight of SiO$_2$ in said reaction mixture is between about 0.1 wt % and about 20 wt %.

5. The method of claim 1, wherein the reaction mixture has a molar ratio of structure directing agent cation, Q, to SiO$_2$ in said reaction mixture of about 0.015 to about 0.025 and a molar ratio of hydroxyl group concentration to SiO$_2$ in said reaction mixture of about 0.14 to about 0.18.

6. The method of claim 1, wherein the alkali metal, M, comprises substantially no sodium.

7. The method of claim 1, wherein the reaction mixture comprises substantially no intentionally added sodium.

8. The method of claim 1, wherein at least 50 vol % of the as-synthesized ZSM-48 crystals have a fibrous morphology.

9. The method of claim 1, wherein at least 50 vol % of the as-synthesized ZSM-48 crystals have a needle-like morphology.

10. A method of synthesizing ZSM-48 crystals, at least 25 vol % of the as-synthesized crystals having a fiber morphology, a needle-like morphology, or a combination thereof, the method comprising:
   crystallizing a reaction mixture comprising a source of water, a source of SiO$_2$, a source of Al$_2$O$_3$, a source of an alkali metal, M, the alkali metal being Li, K, or a combination thereof, and a source of a structure directing agent in the form of an organic cation, Q, having the structure R$_1$—R$_3$—R$_2$,
   the reaction mixture having a molar ratio of structure directing agent cation, Q, to SiO$_2$ in said reaction mixture of 0.01 to 0.05; a molar ratio of SiO$_2$ to Al$_2$O$_3$ in said reaction mixture of 50 to 120; a molar ratio of water to SiO$_2$ in said reaction mixture of 1 to 500; a molar ratio of hydroxyl group concentration to SiO$_2$ in said reaction mixture is from 0.1 to 0.3; and a molar ratio of alkali metal, M, to SiO$_2$ in said reaction mixture is from 0.05 to 0.4,
   where R$_1$ and R$_2$ are the same or different, R$_1$ and R$_2$ being tetraalkylammonium groups having the formula —N$^+$—RR'R", where R, R', and R" are each the same or different, the R, R', and R" alkyl groups each being an alkyl group containing 4 carbons or less, and where $R_3$ is a polymethylene group of formula $(CH_2)_n$, where n=6.

11. The method of claim 10, wherein R, R', and R" are methyl groups, ethyl groups, or combinations thereof.

12. The method of claim 10, wherein the reaction mixture further comprises seeds of ZSM-48 in an amount such that a weight percent of seeds relative to total weight of $SiO_2$ in said reaction mixture is between 0.1 wt % and 20 wt %.

13. The method of claim 10, wherein the reaction mixture comprises substantially no intentionally added sodium.

14. The method of claim 10, wherein at least 50 vol % of the as-synthesized ZSM-48 crystals have a fibrous morphology.

15. The method of claim 10, wherein at least 50 vol % of the as-synthesized ZSM-48 crystals have a needle-like morphology.

* * * * *